United States Patent
Aguir et al.

(10) Patent No.: US 10,753,897 B2
(45) Date of Patent: Aug. 25, 2020

(54) HEATED SENSITIVE LAYER GAS SENSOR

(71) Applicants: UNIVERSITÉ D'AIX-MARSEILLE, Marseilles (FR); CENTRE NATIONAL DE LA RECHERCHE SCIENTIFIQUE, Paris (FR)

(72) Inventors: Khalifa Aguir, Allauch (FR); Marc Bendahan, Plan de Cuques (FR); Virginie Marie Laithier Martini, Marseilles (FR)

(73) Assignees: UNIVERSITE D'AIX-MARSEILLE, Marseilles (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 414 days.

(21) Appl. No.: 15/026,751

(22) PCT Filed: Sep. 29, 2014

(86) PCT No.: PCT/FR2014/052445
§ 371 (c)(1),
(2) Date: Apr. 1, 2016

(87) PCT Pub. No.: WO2015/049445
PCT Pub. Date: Apr. 9, 2015

(65) Prior Publication Data
US 2016/0238548 A1     Aug. 18, 2016

(30) Foreign Application Priority Data
Oct. 1, 2013  (FR) ..................................... 13 59494

(51) Int. Cl.
*G01N 27/12* (2006.01)
*G01N 27/406* (2006.01)
(Continued)

(52) U.S. Cl.
CPC ......... *G01N 27/123* (2013.01); *G01N 27/125* (2013.01); *G01N 27/4067* (2013.01);
(Continued)

(58) Field of Classification Search
CPC ....................................................... H05B 3/20
See application file for complete search history.

(56) References Cited

U.S. PATENT DOCUMENTS 6,012,327 A * 1/2000 Seth ..................... G01N 27/125
422/90
2004/0075528 A1* 4/2004 Carbin ................. H01C 17/003
338/307
(Continued)

FOREIGN PATENT DOCUMENTS

DE    102005057566 A1   6/2007
WO    2006/005332 A2    1/2006

OTHER PUBLICATIONS

Dec. 18, 2014 Search Report issued in International Patent Application No. PCT/FR2014/052445.
(Continued)

*Primary Examiner* — Matthew D Krcha
(74) *Attorney, Agent, or Firm* — Oliff PLC

(57) ABSTRACT

The invention relates to a heated sensitive layer sensor comprising an insulating substrate bearing the sensitive layer; two complementary measurement electrodes in the form of two adjacent conductive tracks configured in electrical contact with the sensitive layer; and a heating element in the form of a resistive track arranged on the substrate for uniformly heating an active area of the sensitive layer. The resistive track comprises at least three power supply points regularly spaced over the length of the resistive track, and each point of even rank is supplied at a first supply voltage and each point of odd rank is supplied at a second supply voltage.

9 Claims, 2 Drawing Sheets

(51) Int. Cl.
*H05B 3/20* (2006.01)
*G01N 27/22* (2006.01)
*G01N 27/407* (2006.01)

(52) U.S. Cl.
CPC ........... *H05B 3/20* (2013.01); *G01N 27/4075* (2013.01); *G01N 2027/222* (2013.01); *H05B 2203/003* (2013.01); *H05B 2203/013* (2013.01); *H05B 2203/037* (2013.01)

(56) References Cited

U.S. PATENT DOCUMENTS

| | | | |
|---|---|---|---|
| 2004/0124713 A1 | 7/2004 | Orr et al. | |
| 2006/0170015 A1 | 8/2006 | Wienand et al. | |
| 2007/0254812 A1 | 11/2007 | Monkemoller | |
| 2008/0123066 A1 | 5/2008 | Hendricus Jansen et al. | |
| 2008/0264146 A1* | 10/2008 | Roesch | G01N 15/0656 73/23.33 |
| 2009/0217737 A1* | 9/2009 | Dorfmueller | F01N 11/00 73/28.01 |
| 2011/0203348 A1* | 8/2011 | Hedayat | G01N 15/0656 73/23.33 |
| 2011/0317739 A1* | 12/2011 | Cole | G01K 7/02 374/179 |

OTHER PUBLICATIONS

Dec. 18, 2014 Written Opinion issued in International Patent Application No. PCT/FR2014/052445.

\* cited by examiner

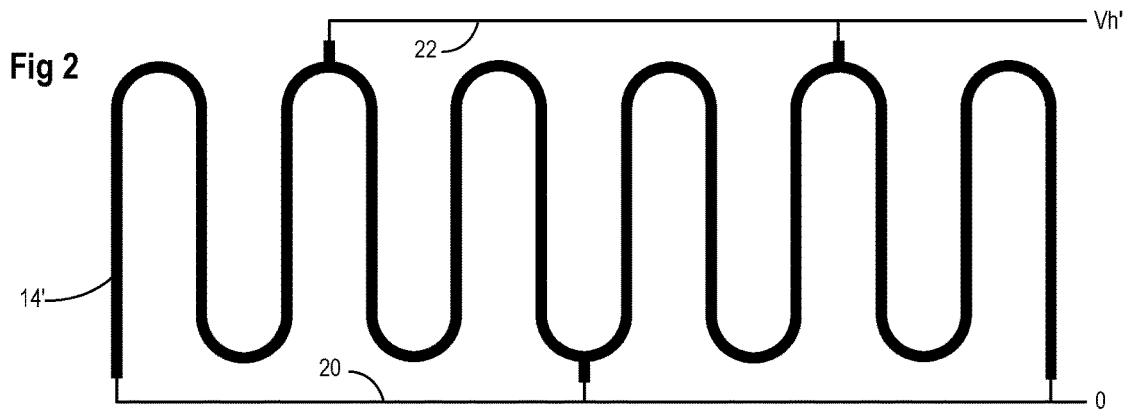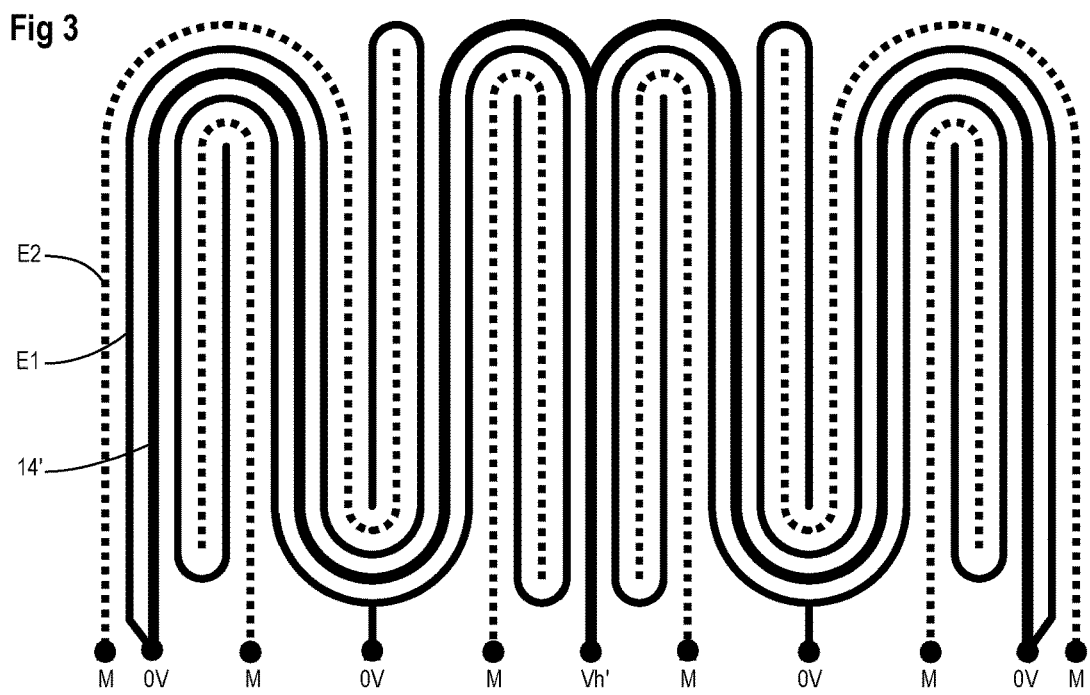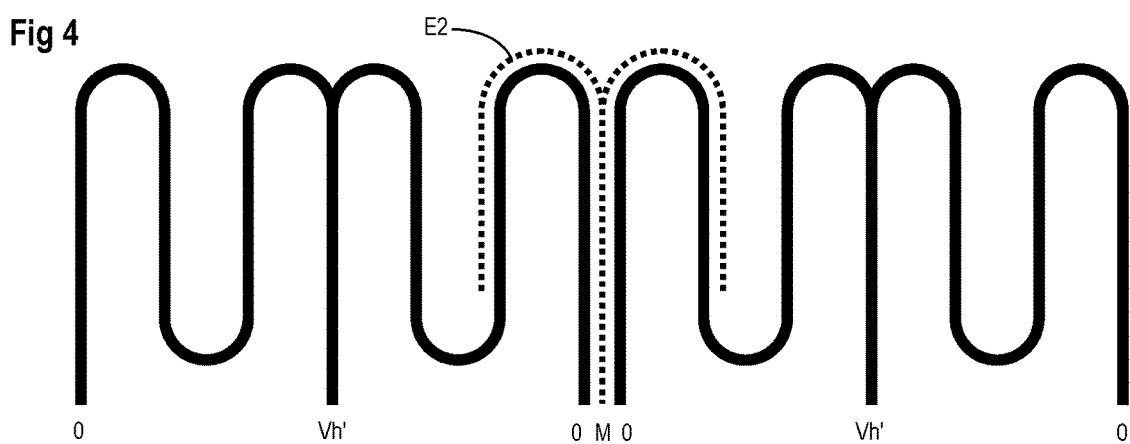

HEATED SENSITIVE LAYER GAS SENSOR

FIELD

The invention relates to molecule sensors, in particular gas sensors, operating with a heated sensitive layer.

BACKGROUND

The sensitive layer of this type of sensor generally comprises a semiconductor oxide, the nature and operating temperature of which are chosen according to the molecules to be detected. The resistivity of the sensitive layer varies depending on the concentration of molecules adsorbed by the oxide layer.

FIGS. 1A and 1B schematically illustrate a top view and a cross-section along an axis AA of a conventional heated sensitive layer sensor, such as described, for example, in papers [I Dewa Putu Hermida et al., "Development of Co Gas Sensing Based SnO2 Thin film", International Journal of Engineering & Technology IJET-IJENS Vol: 13 No: 01] and [George F. Fine et al., "Metal Oxide Semi-Conductor Gas Sensors in Environmental Monitoring", Sensors 2010, 10, 5469-5502].

The sensor comprises an insulating substrate 10 bearing on its upper surface a sensitive layer 12, based on semiconductor oxide. Two complementary electrodes in the form of conductive tracks E1 and E2, are disposed in electrical contact with the sensitive layer 12. The electrodes E1 and E2 are configured to measure changes in resistivity of the zones of the sensitive layer located between the electrodes. To improve the sensitivity, it is desired to increase the adjacent lengths of the two electrodes. For this purpose, the electrode tracks are often formed as interdigitated combs, as shown.

Each electrode includes a contact terminal placed at the periphery of the sensor, outside the active area of the sensitive layer. The terminal of the electrode E1 is set to a ground voltage (0 V) and the terminal of the electrode E2 is set to a measurement voltage M, of the order of 1 V. The sensor is operated by measuring the current flowing between the terminals of the two electrodes.

For heating the sensitive layer 12, a resistive track 14 is provided, which is electrically isolated from the sensitive layer, and placed for example on the bottom surface of the substrate 10. The track 14 is configured to uniformly heat the active area of the sensitive layer, i.e. the areas between the facing fingers of the electrodes. The track 14 is often in the form of a serpentine, as shown. It is supplied between ground (0 V) and a voltage Vh regulated to achieve the desired temperature.

The structure of a heated sensitive layer sensor and the materials used therein are particularly well suited for manufacturing using integrated circuit technologies. The sensor dimensions are then so small that the sensitive layer can be heated up to 350° C. with a power consumption of only 30 mW. It has nevertheless been noted that the sensitive layers of such sensors age faster than in sensors made in other technologies.

SUMMARY

It is thus desired to extend the lifetime of a heated sensitive layer sensor produced using integrated circuit manufacturing technologies.

This need is addressed by a heated sensitive layer sensor, comprising an insulating substrate bearing the sensitive layer; two complementary measurement electrodes in the form of two adjacent conductive tracks configured in electrical contact with the sensitive layer; and a heating element in the form of a resistive track arranged on the substrate for uniformly heating an active area of the sensitive layer. The resistive track comprises at least three power supply points regularly spaced over the length of the resistive track, and each point of odd rank is supplied by a first supply voltage and each point of even rank is supplied by a second supply voltage.

According to an embodiment, the layout of the conductive tracks of the electrodes, projected onto the plane of the resistive track, remains outside a margin defined around the resistive track.

According to an embodiment, the resistive track and the conductive tracks of the electrodes are coplanar.

According to an embodiment, the direction changes of the resistive track and the conductive tracks of the electrodes in the active area of the sensitive layer have a non-zero curvature radius.

According to an embodiment, the resistive track comprises successive U-shaped arcs and the two conductive tracks run parallel to the resistive track, entering each arc with the conductive track remotest from the resistive track ending when exiting the arc, and the conductive track adjacent the resistive track forming, upon exiting the arc, a U-turn around the end of the remotest conductive track to return into the arc.

According to an embodiment, the resistive track is coplanar with the conductive tracks and also in electrical contact with the sensitive layer, the conductive track adjacent the resistive track being set to a ground voltage so that any current flowing in the sensitive layer between the resistive track and the adjacent conductive track does not disturb the current flowing between the conductive tracks.

BRIEF DESCRIPTION OF DRAWINGS

Other advantages and features will become more clearly apparent from the following description of particular embodiments of the invention provided for exemplary purposes only and represented in the appended drawings, in which:

FIG. 2 schematically shows an embodiment of a resistive track of a sensor heating element that increases the life time of the sensor;

FIG. 3 schematically shows another embodiment of a resistive track and an embodiment of suitable electrodes; and FIG. 4 illustrates a series connection technique for several structures of the type of FIG. 3.

DESCRIPTION OF EMBODIMENTS

Figure 1A:
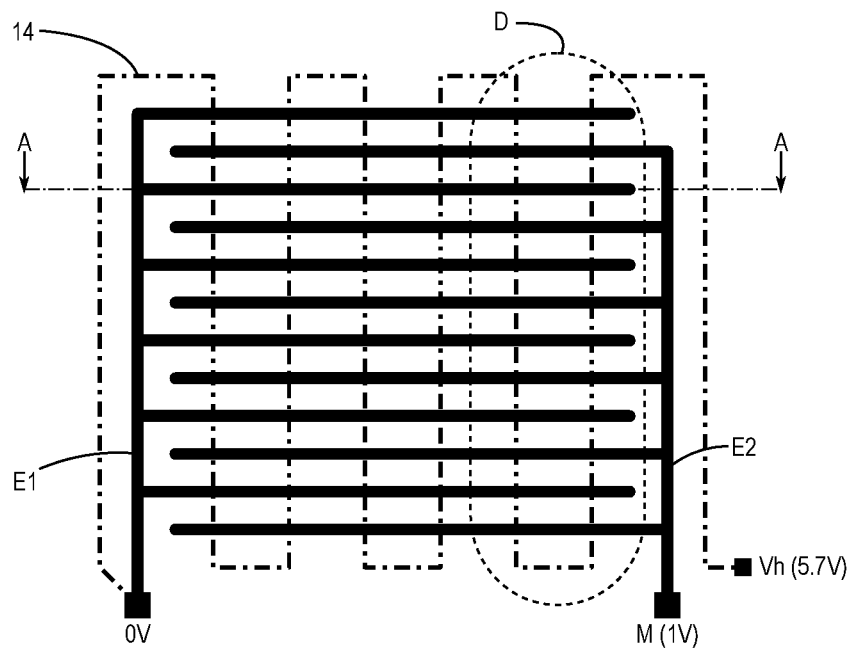
FIGS. 1A and 1B, previously described, schematically show a top view and a cross-section of a conventional heated sensitive layer sensor.

The inventors have found that the sensitive layer of a small-sized heated sensor, especially when the sensor is produced using integrated circuit manufacturing techniques, deteriorates mainly on the side of the higher voltage (Vh) supplying the resistive track, in a region D shown in FIG. 1A. The inventors attribute this effect to the electric field withstood by the sensitive layer. Indeed, the supply voltage Vh of the resistive track may be relatively high, up to 5.7 V, and the distance between the resistive track and the conductive tracks of the electrodes may be particularly small in integrated circuit technologies, so that an intense electric field establishes at each intersection of an electrode with the resistive track, on the side where the resistive track is at the highest voltage. It is indeed at these track intersections that the first damages occur to the sensitive layer.

To avoid this deterioration caused by the electric field, the fact of moving the resistive track away from the electrodes does not solve the problem, because the heating efficiency would decrease and would require an increase in the supply voltage of the resistive track.

FIG. 2 schematically shows a resistive track configuration 14' of the heating element, that decreases the electric field without decreasing the heating efficiency. The resistive track, here in the form of a serpentine, comprises, besides the power supply terminals at each end, one or more intermediate supply points regularly spaced along the length of the resistive track. In FIG. 2, the resistive track comprises three intermediate supply points, for example, in all five supply points counting the end terminals. The odd ranked points are supplied by a first of the power supply voltages, e.g. ground (0 V), and the even ranked points are powered by the second supply voltage, high voltage Vh'. To this end, the odd ranked points may be connected to a common low resistivity line 20 supplied by the first voltage, and the even ranked points may be connected to a common low resistivity line 22 supplied by the second voltage.

With the shown configuration, the voltage Vh' may be divided by four relative to the voltage Vh required with only two power supply terminals, while providing the same heating power. Indeed, each segment of the serpentine has a quarter of the total resistance and sees across its ends a quarter of the conventional supply voltage: the current is unchanged from the conventional configuration, so the power dissipated is the same. The electric field may thus be divided by the number of segments used in the resistive track.

To simplify the manufacture of the sensor it is desired to make the tracks of the electrodes and the resistive track coplanar. This allows forming the tracks with a single mask level. In this case, as shown in FIG. 2, it is preferable that the supply terminals are located on the edges of the sensor, to avoid routing power supply tracks through the active zone of the sensor or placing vias in this area. The power supply terminals may then be connected to metal tracks and vias arranged outside the active area of the sensor.

FIG. 3 schematically shows another sensor embodiment. The resistive track 14' here comprises two serpentine segments that are symmetrical relative to a vertical axis passing through the central supply point, here supplied by voltage Vh'. If each segment has an odd number of arcs, as shown, the end supply points, here at 0 V, are located on the same edge of the sensor as the center point.

With this configuration, the central section of the resistive track conveys the current for each of the two segments, and thus sees two times more current than each of the segments. If the central section has the same resistivity as the rest of the resistive track, it would dissipate four times more power than the rest. To homogenize the heating power, the central section may be sized to present a quarter of the resistivity of the rest of the track.

FIG. 3 also shows an exemplary routing configuration of the electrodes E1 and E2, so that they can be made in the same plane as the resistive track 14'. This electrode routing is moreover configured to further reduce the electric fields withstood by the sensitive layer.

Figure 1B:
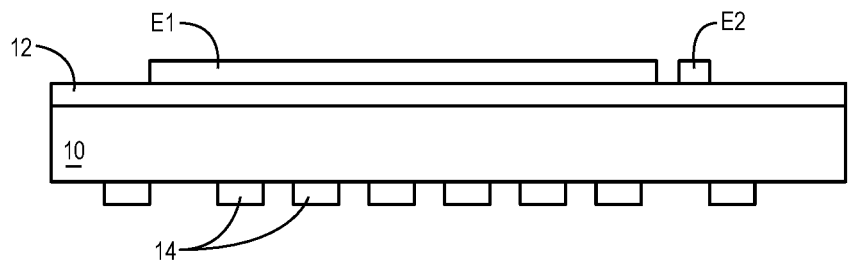

Conventional electrode routing configurations, such as shown in FIG. 1B, have many direction changes with a curvature radius close to zero. This results in local accentuation of the electric field at each direction change.

To reduce this effect, as shown in FIG. 3, the direction changes of the tracks of electrodes E1, E2, and the resistive track 14' follow a non-zero curvature radius, such as circular arcs. The serpentine path of the resistive track 14' may be formed of a succession of "U" shaped arcs. Regarding the electrodes, it also sought to avoid comb-like paths with many right angles and sharp ends. Thus, the tracks of the two electrodes E1, E2 remain parallel to the resistive track 14' and penetrate each arc. When exiting the arc, the electrode most remote from the resistive track, here E2, stops, while the electrode adjacent the resistive track, here E1, achieves a U-turn around the tip of electrode E2 to return into the arc. This routing configuration helps increasing the facing lengths of the electrodes without using comb patterns.

With this electrode layout technique, a pair of electrode tracks E1, E2 is formed for each arc of the serpentine. The starting point of each track of the pair is connected to a terminal on the edge of the sensor, from which the track may be supplied and connected to peer tracks of the other arcs, if necessary through vias, outside the active zone of the sensor.

At the beginning of the resistive track 14', as shown, a pair of electrodes E1, E2 starts on the same side as the resistive track and follows the first arc in parallel from the outside until the next arc, where the pattern described above is started. The pattern at the end of the resistive track may be symmetrical.

The configuration of FIG. 3 allows achieving the tracks of the electrodes and the resistive track in a same plane in contact with the sensitive layer. The resistive track 14', if it is in electrical contact with the sensitive layer, could generate spurious currents in the sensitive layer which could disturb the measurement from the electrodes.

To prevent this, a local insulator could be deposited between the sensitive layer and the resistive track, or the sensitive layer could be deposited locally on the electrodes. This would adversely affect the heating efficiency of the sensitive layer.

The power supply configuration of the electrodes shown in FIG. 3 avoids the effect of spurious currents generated by the resistive track when it is in electrical contact with the sensitive layer. The tracks of electrode E1 adjacent the resistive track are grounded (0 V) while the more distant tracks of electrode E2 are supplied by the measurement voltage M. Then any current tending to flow in the sensitive layer between the tracks of electrode E1 and the resistive track 14' goes to ground and fails to reach the tracks of electrode E2.

In such circumstances, the track structure of FIG. 3 may be used interchangeably with a sensitive layer deposited below or above the structure. Depositing the sensitive layer above is preferred, as it then exposes a larger surface area to the environment.

The configuration of FIG. 3 may be used in a more traditional structure, with the resistive track 14' placed in a different plane than the electrodes E1, E2. The structure then still offers the benefits of lower electric fields. The proportions and the position of the resistive track and the electrodes may be maintained, so that the layout of the electrode tracks, projected onto the plane of the resistive track, remains outside a margin defined around the resistive track—in other words crossing the electrode tracks with the resistive track is avoided in the active zone of the sensor.

FIG. 4 illustrates an exemplary technique for connecting in series several structures of the type shown in FIG. 3. Two structures of the type of FIG. 3 may be joined by using in common a lateral section of the electrode E2. It is thus possible to reduce the resistive track supply voltage Vh' by a factor equal to the number of segments to address the needs of the intended application.

This configuration enables using the whole structure as a single sensor, by connecting the different structures together, or using the different structures separately, thus achieving a "multisensor" configuration providing several different signals (based on the temperature of each serpentine, for example), e.g. an "electronic nose" device.

What is claimed is:

1. A heated sensitive layer sensor obtained by an integrated circuit manufacturing technology, comprising:
   an insulating substrate bearing a sensitive layer;
   two complementary measurement electrodes in a form of two adjacent conductive electrode tracks arranged in electrical contact with the sensitive layer to measure resistivity of the sensitive layer between the two conductive electrodes; and
   a heating element in a form of a resistive track arranged on the substrate for heating an active area of the sensitive layer, the resistive track including at least three power supply points spaced over a length of the resistive track, whereby the resistive track is divided into a plurality of segments between the power supply points,
   wherein:
       the resistive track comprises successive U-shaped arcs;
       a first of the two conductive electrode tracks penetrates at least one of the U-shaped arcs of the resistive track, and runs parallel to the U-shaped arc to form an embedded arc; and
       a second of the two conductive electrode tracks penetrates the embedded arc formed by the first conductive electrode track.

2. The sensor according to claim 1, wherein:
   a layout of the two conductive electrode tracks, projected onto a plane of the resistive track, remains outside a margin defined around the resistive track.

3. The sensor according to claim 2, wherein:
   the resistive track and the two conductive electrode tracks are coplanar.

4. The sensor according to claim 2, wherein:
   direction changes of the resistive track and the two conductive electrode tracks in the active area of the sensitive layer have a non-zero curvature radius.

5. The sensor according to claim 4, wherein:
   the two conductive electrode tracks are configured such that:
   (i) the second conductive electrode track ends when exiting the U-shaped arc; and
   (ii) the first conductive electrode track forms, upon exiting the U-shaped arc, a U-turn around the end of the second conductive electrode track to return into the U-shaped arc.

6. The sensor according to claim 5, wherein:
   the resistive track is coplanar with the two conductive electrode tracks and also in electrical contact with the sensitive layer; and
   the first conductive electrode track is set to a ground voltage so that any current flowing in the sensitive layer between the resistive track and the first conductive electrode track does not disturb a current flowing between the two conductive electrode tracks.

7. The sensor according to claim 1, wherein:
   the resistive track is configured to heat the sensitive layer up to 350° C.

8. A heated sensitive layer sensor, comprising:
   an insulating substrate bearing a sensitive layer;
   two complementary measurement electrodes in a form of two adjacent conductive electrode tracks arranged in electrical contact with the sensitive layer and configured to measure resistivity of the sensitive layer between the two conductive electrodes; and
   a heating element including a resistive track arranged in electrical contact with the sensitive layer, wherein:
   a first of the two conductive electrode tracks runs parallel to the resistive track, between the resistive track and a second of the two conductive electrode tracks, such that no portion of the second conductive electrode track is adjacent the resistive track; and
   one end of the first conductive electrode track is electrically connected to one end of the resistive track.

9. The sensor according to claim 8, wherein:
   direction changes of the resistive track and the two conductive electrode tracks in the active area of the sensitive layer have a non-zero curvature radius.

* * * * *